(12) United States Patent
Zucker et al.

(10) Patent No.: US 10,891,561 B2
(45) Date of Patent: Jan. 12, 2021

(54) IMAGE PROCESSING FOR ITEM RECOGNITION

(71) Applicant: NCR Corporation, Atlanta, GA (US)

(72) Inventors: Brent Vance Zucker, Roswell, GA (US); Adam Justin Lieberman, Suwanee, GA (US); Alen Polakof, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 113 days.

(21) Appl. No.: 16/144,721

(22) Filed: Sep. 27, 2018

(65) Prior Publication Data

US 2020/0104748 A1 Apr. 2, 2020

(51) Int. Cl.
| | |
|---|---|
| *G06N 5/00* | (2006.01) |
| *G06T 7/40* | (2017.01) |
| *G06T 7/246* | (2017.01) |
| *G06Q 10/08* | (2012.01) |
| *G06N 7/00* | (2006.01) |
| *G06F 16/583* | (2019.01) |
| *G06N 20/00* | (2019.01) |
| *G06F 16/58* | (2019.01) |

(52) U.S. Cl.
CPC ............. *G06N 20/00* (2019.01); *G06F 16/58* (2019.01); *G06F 16/5838* (2019.01); *G06N 7/005* (2013.01); *G06Q 10/087* (2013.01); *G06T 7/251* (2017.01); *G06T 2207/10016* (2013.01); *G06T 2207/30128* (2013.01); *G06T 2207/30201* (2013.01); *G06T 2207/30232* (2013.01)

(58) Field of Classification Search
USPC ................. 382/115–133, 154–165, 168–226, 382/254–312; 396/7–13, 20–29, 51, 153, 396/322–347, 360–386, 433–439
See application file for complete search history.

(56) References Cited

U.S. PATENT DOCUMENTS

| | | | |
|---|---|---|---|
| 2019/0080467 A1* | 3/2019 | Hirzer | G06T 7/73 |
| 2020/0074393 A1* | 3/2020 | Fisher | G06K 9/4628 |
| 2020/0074394 A1* | 3/2020 | Fisher | G06N 3/08 |

OTHER PUBLICATIONS

Wojke, Nicolai, et al., "Simple Online and Realtime Tracking with a Deep Association Metric", 2017 IEEE International Conference on Image Processing (ICIP), (Sep. 2017), 5 pages.

* cited by examiner

Primary Examiner — Marcellus J Augustin
(74) Attorney, Agent, or Firm — Schwegman, Lundberg & Woessner

(57) ABSTRACT

Cameras capture time-stamped images of predefined areas. Occluded images that represent obstructed views of items are processed using a combination of machine-learning and a probabilistic approach based on a planogram for the items and the items' location within a store. Output from the machine-learning and probabilistic approach are item identifiers that identify the items as known items to the store.

20 Claims, 4 Drawing Sheets

IMAGE PROCESSING FOR ITEM RECOGNITION

BACKGROUND

Computer vision and image processing techniques have advanced in recent years. However, one difficult and unsolved processing task includes item recognition.

This has been particularly difficult in frictionless store systems where a variety of situations can occlude images captured for an item. Shoppers often pass between one another and the lens of the cameras or a shopper's hand can pass between the lens and the item so as to block a clear image of the item being picked up by the shopper.

These real-world problems have confounding frictionless store solutions because these situations occur more frequently than not, making frictionless stores solutions appear infeasible in the industry.

SUMMARY

In various embodiments, methods and a system for image processing for item recognition are presented.

According to an embodiment, a method for image processing to recognize and item is presented. A determination is made that a tracked item is unable to be identified as a known item from an image. The image is provided as an input to a machine-learning algorithm, and an item identifier for the known item is determined from an output provided by the machine-learning algorithm.

DETAILED DESCRIPTION

Figure 1:
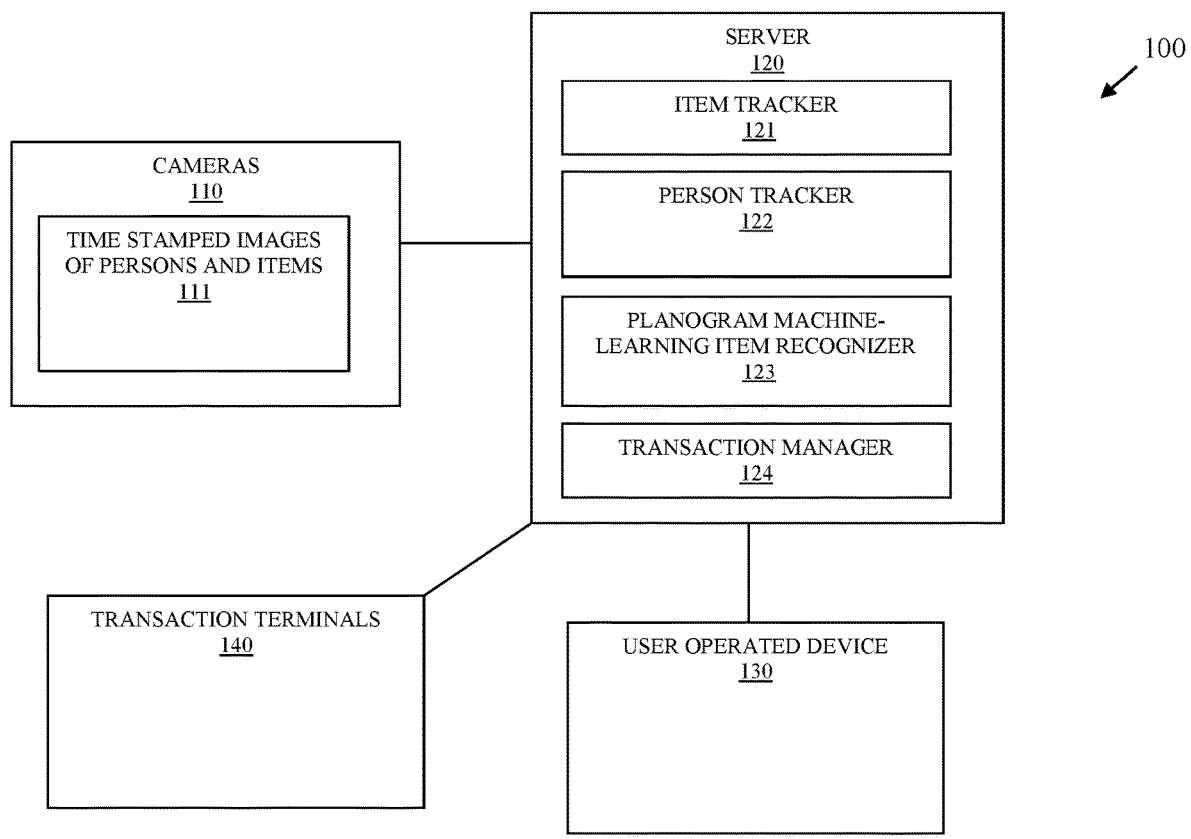
FIG. 1 is a diagram of a system for image processing to recognize an item, according to an example embodiment.

FIG. 1 is a diagram of a system 100 for image processing to recognize an item, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of image processing for item recognition, presented herein and below.

As used herein and below, the terms "customer," "consumer," and "user" may be used interchangeably and synonymously.

The system 100 includes a plurality of cameras 110 that capture time-stamped images of persons and items (herein after just "images 111"). The system 100 may include a user-operated device 130 and one or more transaction terminals 140. The server 120 includes executable instructions that execute on one or more hardware processors of the server 120 from a non-transitory computer-readable storage medium as: an item tracker 121, a person tracker 122, a planogram machine-learning item recognizer manager 123, and a transaction manager 124.

It is to be noted that although not illustrated in the FIG. 1, the server 120 also includes one or more hardware processors, volatile and non-volatile memory, non-volatile storage, and networking circuitry (such as wired ports and/or wireless transceivers).

It is also to be noted that there may be multiple servers, such that the different elements 121-124 may execute on a same server 120 or multiple different servers networked together.

When a customer enters a store or is outside the store in the parking lot, cameras 110 begin capturing the time-stamped images 111 in frames. In an embodiment, the cameras 110 capture images at a rate of 20 to 30 frames per second.

The cameras 110 are preconfigured to capture images 111 of the defined areas based on the field-of-view of the lenses of the cameras 110. Some of the cameras 110 may capture images 111 representing portions of a different area that a different one of the cameras 110 captures images 111 for. That is, each image 111 can include pixel values that overlap multiple ones of the defined areas.

Initially, the cameras 110 are situated in locations throughout an enterprise (such as a retail store but can be other enterprises or even a consumer's home). Each camera lens configured to cover one or more predefined areas of the physical space of the enterprise.

Furthermore, metadata is assigned to each camera 110 to include a unique camera identifier, a location identifier (representing the physical location that the camera 110 is situated within the enterprise, and one or more area identifiers (representing the predefined areas that the lens of the camera 110 captures in the images 111).

Each camera 110 provides time stamp and frame stamped images to the server 120. These images can be streamed over a wired or wireless connection between the cameras 110 and the server 120 to a commonly accessible storage area on the server 120 that is accessible to the item tracker 121, the person tracker 122, and the planogram machine-learning recognizer 123. In an embodiment, some of the images when streamed from the cameras 110 can be buffered or cached in memory of cache and made accessible from the memory or cache to the item tracker 121, the person tracker 122, and the planogram machine-learning recognizer 123.

Each accessible image 111 includes its metadata (minimally including what was discussed above) with its image 111 on the server 120.

The person tracker 122 processes the pixels of the images to identify a unique person (the actual identity of the person can be unknown but the person tracker identifies that a person is in the time-stamped images 111). Attributes for the unique person are identified as metadata that permit the person tracker 122 to quickly and accurately identify the unique person as that person travels through the store and exits the store from the time-stamped images 111. Attributes can include clothing type, color, height, width, shoes, extremity features, eye glasses (sun glasses), hats, eye color, etc. A bounding box is placed around the unique person with the generated metadata. As more images 111 are captured from the cameras 110, the additional attributes can be added to the metadata, some existing attributes can be modified as modified metadata, some existing attributes initially believed to be associated with the person can be removed as deleted metadata. The person tracker 122 may also have its own machine-learning algorithm that is trained over time, such that the types of attributes represented in the metadata changes or the pixel information associated with particular metadata is changed. In this way, the accuracy of the person tracker 122 improves with time as does the processing throughput associated with producing the metadata representing the attributes from the images 111.

In an embodiment, the person tracker 122 is configured with facial recognition to obtain an identity of a person being tracked from the images.

In a similar manner, the item tracker 121 identifies from the images 111 items that are handled by the people being tracked by the person tracker 122. That is, the item tracker 121 receives the images, crops off pixels that are known to not be associated with the item (such as the pixels associated with background objects or a person). Each item includes a unique identifier for tracking even though the actual item may be unknown or unrecognized from the images. That is, (and similar to the person tracker 122), an item identity (such as the item's description, actual item barcode level of detail, etc.) is unknown in the time-stamped frames but is still assigned and associated with a unique tracking identifier in the frames/images 111 so as to distinguish between other unknown items of the store or other unknown items possessed by the customer. Again, attributes associated with the unknown item is carried as metadata from frame 111 to frame, so that the item tracker 121 can quickly identify and crop from later-in-time received images 111 the specific pixels or bounding box being tracked for the unknown item. Attributes can include, color, height, width, edges, bottle shape, item label or packaging characteristics, can shape, box shape, undefined shape, edges, etc.

The item tracker 121 is further configured to report to the transaction manager 124 when a previously unknown and tracked item is identified by the item tracker 121. That is, each item is tracked regardless as to whether it is a known item or an unknown item. Once the item tracker 121 has enough information from the images 111 to make a decision as to an identity for an item (item barcode level of detail), the item tracker 121 immediately reports the item identity to the transaction manager 124.

As used herein, a "planogram" is a data structure maintained for a store that includes placement locations of items within the store based on their specific location within the store. The specific location can include aisle number, shelf number, position on a specific shelf number, floor location, etc. The planogram data structure provides a mapping between each item of the store and that items known location. This location is a fine-grain location and not a coarse grain location that is represented in the planogram down to a location within a specific shelf (centered, right, left, maybe even a preconfigured distance from a far left or far right edge of a given shelf and the specific product continuing on the given shelf for a specific distance, etc.). The planogram data structure includes an item identifier for a given item that links to the specific locations for the given item. It is noted that a single item identifier for a single item can have multiple different specific locations within the store because often retailers place a same item type throughout the store in multiple locations. So, the links or mappings between the item identifier is not a one-to-one mapping to a single item location (although in some embodiments for some items this can be the case); however, in many situations the single item identifier includes a one-to-many mapping to specific locations within the store.

The item tracker 121 tracks known and unknown items through the images. When the item tracker 121 is unable to determine from a cropped image representing the item, an identity of the item (store or bar coded level of detail represented by an item identifier recognized by the store's item database), then the item tracker passes the cropped image of the item being tracked to the planogram machine-learning recognizer 123.

The planogram machine-learning recognizer 123 is trained on cropped images of items that are occluded in some manner partially covered or nearly entirely covered in the cropped image provided by the item tracker 121. The planogram machine-learning recognizer 123 is trained on input that includes the cropped images of occluded items and a planogram data structure representing item locations (as discussed above for items in the store). Each cropped image includes the metadata that is being captured with the images as they are processed that metadata is also available as the trained input to the planogram machine-learning recognizer 123 and includes, frame number, item tracking identifier, camera identifier, camera area of coverage within the store, and time stamp.

During training sessions that trains the planogram machine-learning recognizer 123, the planogram machine-learning recognizer 123 is provided the above-noted input (cropped images with the corresponding metadata and a link or access to the planogram data structure). It is also to be noted that the planogram data structure does not have to be provided as input; rather the planogram machine-learning recognizer 123 can be configured to access a runtime value that provides the location for the planogram machine-learning recognizer 123 to access the planogram data structure; the point is that the input processed by the planogram machine-learning recognizer 123 includes the cropped images with metadata and the planogram data structure.) Additionally, the input provided during the training session to the planogram machine-learning recognizer 123 includes a known item identifier (item identifier) represented in the occluded cropped image.

The planogram machine-learning recognizer 123 configures its factors and regression analysis so as to produce an algorithm that properly recognizes the item based on the provided input data in order to match the expected output. This permits the planogram machine-learning recognizer 123 to generate probabilities during a live and non-training production-based setting when provided any given occluded cropped image of an unknown item provided by the item tracker 121. The output produced by the planogram machine-learning recognizer 123 includes a sorted list of item identifiers (for known items in the store), each entry in the sorted list including a probability and an item identifier (again, the list sorted from highest probability to lowest probability, such that the first entry in the list represents the known item identifier in the store with the highest returned probability.

In an embodiment, the planogram machine-learning recognizer 123 does not take as input the planogram data structure; rather as a post process to the returned list from the planogram machine-learning recognizer 123, the item tracker 121 compares the probabilities against the planogram to select the item from the list returned that maps most closely to the planogram based on the location that the image was associated with within the store obtained from the image metadata. So, here the planogram can be processed after the planogram machine-learning recognizer 123 produces its predictions about what the item is or is not.

In an embodiment, the store is divided into predefined grids based on location associated with the cameras and area of coverage of each camera. The planogram includes a grid identifier for a grid and grid cell identifiers for each grid, such that for any given image a specific grid can be readily determined based on the camera that captured the cropped image and a known location and field-of-view coverage through searching the planogram. Each grid further includes grid cells, each grid cell associated with a specific known item.

As an example, consider a tracked item image taken from a first camera, the camera identification permits identification of a specific grid and set of grid cells for which the image is associated with and the corresponding items in those grid cells. As a shopper is approaches a known grid cell, if an item is detected in a cropped image that is unknown, it can be assumed that there is a high probability that the shopper took the item designated in the planogram for that grid cell. As the shopper is moving away from the grid cell with no image indicating an item was missing (cameras 110 may also capture images of shelves and if an item is present in one frame but is missing in another frame that provides an indication that something was picked up by the shopper when the shopper is in each of the frames) or picked up by the shopper, then when a cropped subsequent image shows a tracked item there is a lower probability the item was from the grid cell but a higher probability it came from a further grid cell adjacent to the original grid cell.

The planogram machine-learning recognizer 123 and the item tracker 121 provide a deep machine-learning approach that adds probabilistic processing based on the planogram data structure. This added probabilistic approach increases the accuracy in properly recognizing items (matching items to known items) with occluded images of the items. The added probabilistic approach can be included with the planogram machine-learning recognizer 123 or provided as a post process to the planogram machine-learning recognizer 123 by the item tracker (as discussed above). Occluded item images are common and frequent in a frictionless store-based system because real-world conditions often include obstructions captured in the images that preclude obtaining a clear and quality unobstructed image of an item and item label. Therefore, the system 100 improves the accuracy in classifying and identifying items that are being picked up by a shopper in a frictionless store.

The transaction manager 124 maintains a unique shopping cart for each person being tracked by the person tracker 122. The shopping cart includes all of the item identifiers (known or unknown depending on any give state of the processing performed by the item tracker 121) for the person being tracked. Once the item tracker 121 is able to identify an unknown tracked item, the item tracker 121 provides the item identifier for the known item to the transaction manager 124 for replacing the unknown item tracking identifier with the known item identifier. Determination by the item tracker 121 of the item identifier is improved by the above noted machine-learning and planogram probabilistic approach, such that the item tracker 121 is able to more rapidly and efficiently recognize unknown tracked items and known tracked items.

The transaction manager 124 can check out any given person in a variety of manners. When the person tracker 122 has identified a customer and the customer is pre-registered with the store and has a registered payment method, then the transaction manager can process that payment method when the person is identified by the person tracker 122 as approaching or leaving an egress point of the store. When the person tracker 122 was unable to obtain the identity of the person, the person can check out at a transaction terminal 140; the transaction manager 124 interacts with an agent process on the transaction terminal 140 and provides the shopping cart items for payment when the person tracker 122 identifies the person as being present at the transaction terminal 140. When the person (identified or unidentified) has a mobile application downloaded to the person's user device 130, the transaction manager interacts with the mobile application to present the items in the shopping cart and obtain payment from the person. Other approaches for checkout may be used as well, where the transaction manager 124 and the person tracker 122 cooperate to obtain payment for known persons (identity known) and for unknown persons (identity unknown).

In an embodiment, the transaction terminal 140 is one or more of: A Point-Of-Sale (POS) terminal and a Self-Service Terminal (SST).

In an embodiment, the user-operated device 130 is one or more of: a phone, a tablet, a laptop, and a wearable processing device.

These embodiments and other embodiments are now discussed with reference to the FIGS. 2-4.

Figure 2:
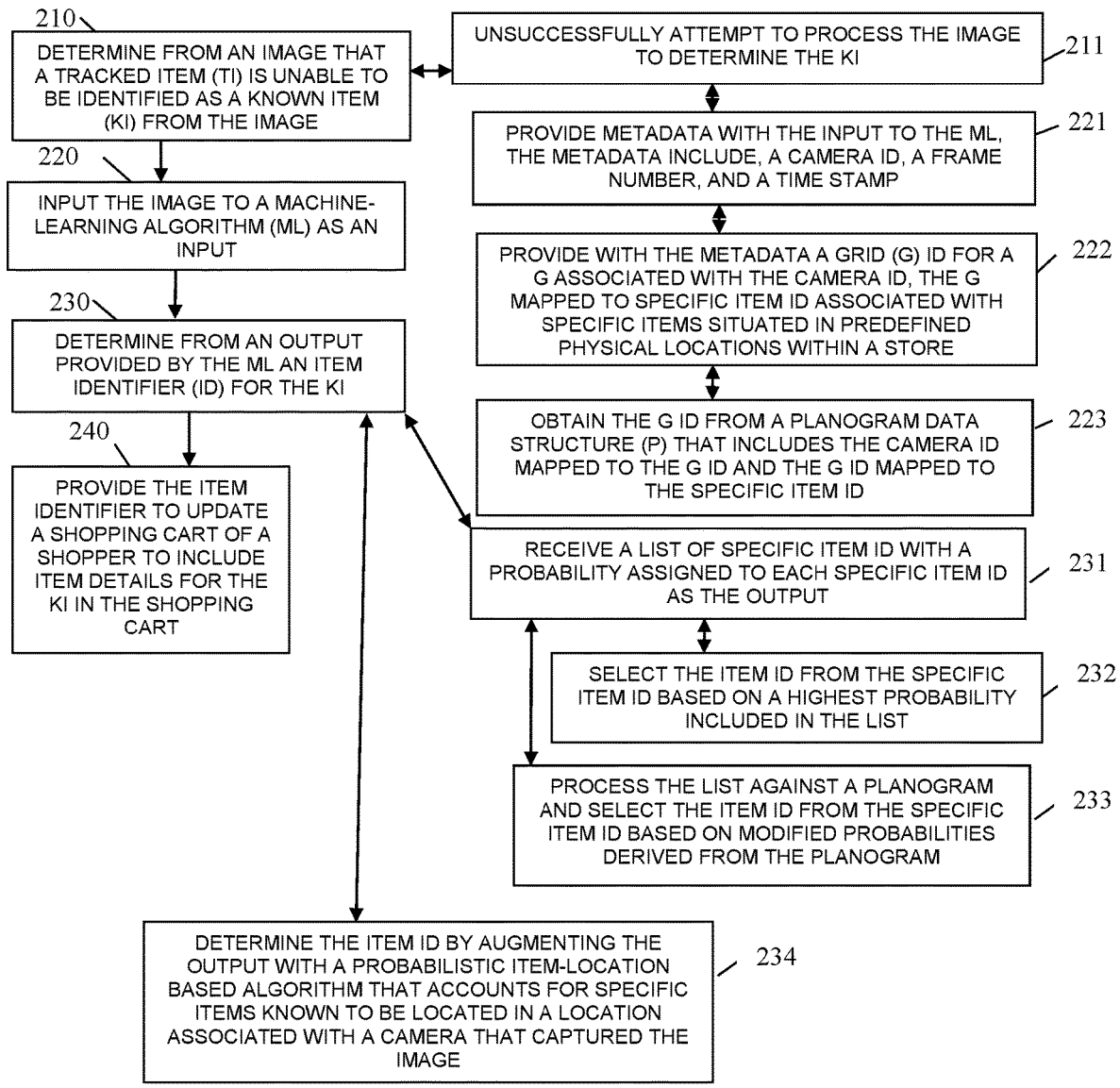
FIG. 2 is a diagram of a method for image processing to recognize an item, according to an example embodiment.

FIG. 2 is a diagram of a method 200 for image processing to recognize an item, according to an example embodiment. The software module(s) that implements the method 200 is referred to as a "machine-learning probabilistic item identifier." The machine-learning probabilistic item identifier is implemented as executable instructions programmed and residing within memory and/or a non-transitory computer-readable (processor-readable) storage medium and executed by one or more processors of a device. The processor(s) of the device that executes the machine-learning probabilistic item identifier are specifically configured and programmed to process the machine-learning probabilistic item identifier. The machine-learning probabilistic item identifier has access to one or more network connections during its processing. The network connections can be wired, wireless, or a combination of wired and wireless.

In an embodiment, the device that executes the machine-learning probabilistic item identifier is the server 120. In an embodiment, the server 120 is a cloud-based server.

In an embodiment, the machine-learning probabilistic item identifier is all or some combination of: the item tracker 121, the person tracker 122, the planogram machine-learning item recognizer 123, and the transaction manager 124.

At 210, the machine-learning probabilistic item identifier determines from an image that a tracked item is unable to be identified as a known item from the image.

In an embodiment, at 211, the machine-learning probabilistic item identifier unsuccessfully and initially attempts to process the image to determine the known item from the image. This provides an indication that the representation of the item depicted in the image is obscured or occluded in some manner within the pixels of the image.

At 220, the machine-learning probabilistic item identifier inputs the image to a machine-learning algorithm as an input. In an embodiment, the machine-learning algorithm is the planogram machine-learning item recognizer 123.

In an embodiment of 211 and 220, at 221, the machine-learning probabilistic item identifier provides metadata with the input to the machine-learning algorithm. The metadata, at least, including: a camera identifier for a camera that captured the image, a frame number, and a time stamp.

In an embodiment of 221, at 222, the machine-learning probabilistic item identifier provides with the metadata a grid identifier for a grid associated with the camera identifier. The grid mapped to specific item identifiers associated with specific items situated in predefined physical locations within a store.

In an embodiment of 222, at 223, the machine-learning probabilistic item identifier obtains the grid identifier from a planogram data structure that includes the camera identifier mapped to the grid identifier, and the grid identifier mapped to the specific item identifiers.

In an embodiment, the planogram data structure is the planogram data structure discussed above with the FIG. 1.

At 230, the machine-learning probabilistic item identifier determines from an output provided by the machine-learning algorithm and item identifier for a known item.

In an embodiment, at 231, the machine-learning probabilistic item identifier receives a list of specific item identifiers with a probability assigned to each specific item identifier as the output received from the machine-learning algorithm.

In an embodiment of 231 and at 232, the machine-learning probabilistic item identifier selected the item identifier from the specific item identifiers based on a highest probability included in the list.

In an embodiment of 231 and at 233, the machine-learning probabilistic item identifier processes the list against a planogram and selects the item identifier from the specific item identifiers based on modified probabilities derived from the planogram.

In an embodiment, at 234, the machine-learning probabilistic item identifier determines the item identifier by augmenting (adding to or modifying) the output with a probabilistic item-location based algorithm that accounts for specific items known to be located in a location associated with a camera that captured the image.

In an embodiment, at 240, the machine-learning probabilistic item identifier provides the item identifier to update a shopping cart of a shopper in order to include item details for the known item in the shopping cart of the shopper.

Figure 3:
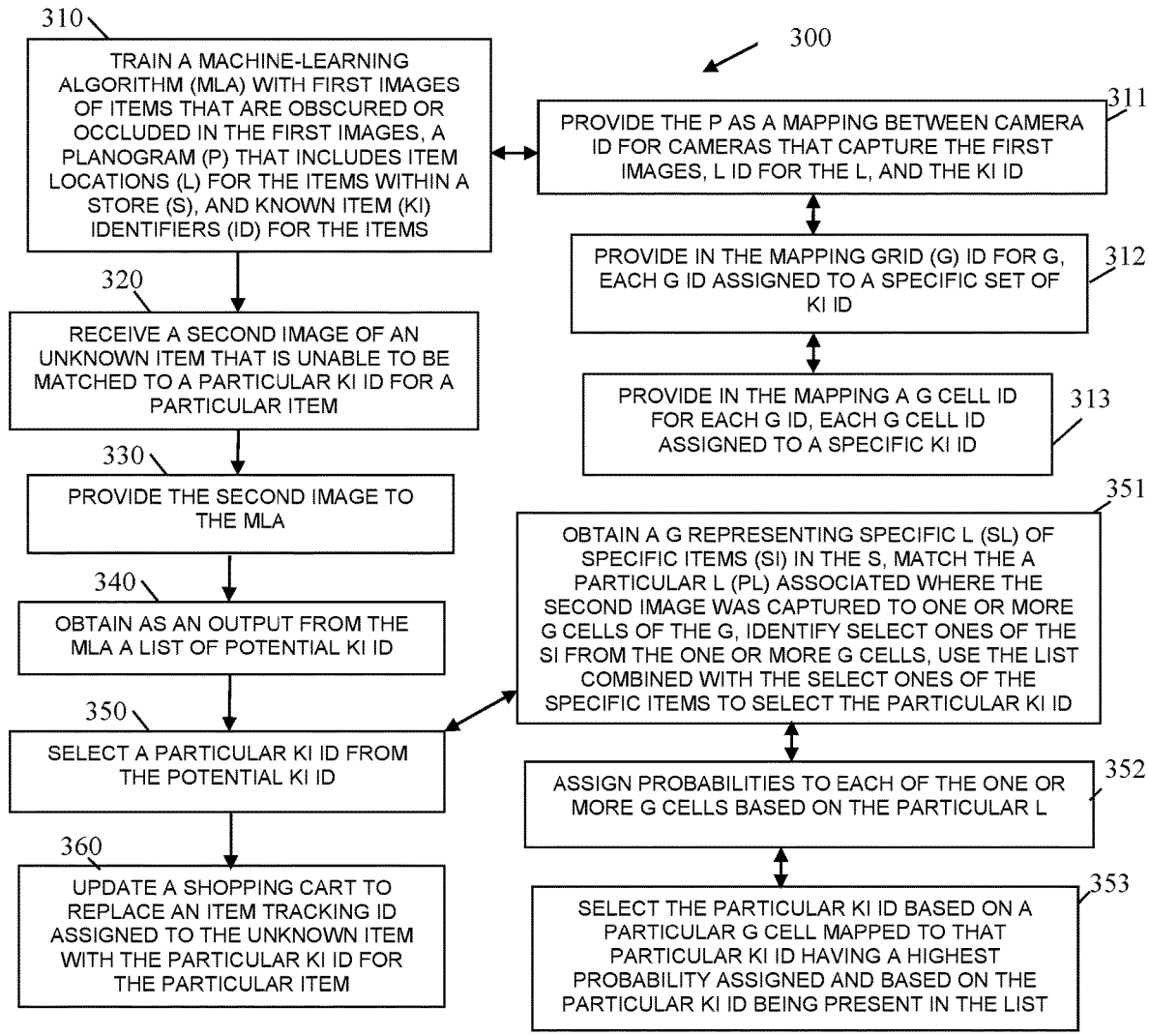
FIG. 3 is a diagram of another method for image processing to recognize an item, according to an example embodiment.

FIG. 3 is a diagram of another method 300 for image processing to recognize an item, according to an example embodiment. The software module(s) that implements the method 300 is referred to as an "item determiner." The item determiner is implemented as executable instructions programmed and residing within memory and/or a non-transitory computer-readable (processor-readable) storage medium and executed by one or more processors of a device. The processors that execute the item determiner are specifically configured and programmed to process the item determiner. The item determiner has access to one or more network connections during its processing. The network connections can be wired, wireless, or a combination of wired and wireless.

In an embodiment, the device that executes the item determiner is the server 120. In an embodiment, the server 120 is a cloud processing environment.

In an embodiment, the item determiner is all of or some combination of: the item tracker 121, the person tracker 122, the item-planogram machine-learning item recognizer 123, the transaction manager 124, and/or the method 200.

The item determiner presents another and in some ways enhanced processing perspective of the method 200 discussed above.

At 310, the item determiner trains a machine-learning algorithm with first images of items that are obscured or occluded in the first images, a planogram data structure that includes item locations for the items within a store, and known item identifiers for the items. In an embodiment, the machine-learning algorithm is the planogram machine-learning item recognizer 123. In an embodiment, the planogram data structure is the planogram data structure discussed above with the FIG. 1.

In an embodiment, at 311, the item determiner provides the planogram as a mapping between camera identifiers for cameras that capture the first images, location identifiers for the locations, and the known item identifiers.

In an embodiment of 311, at 312, the item determiner provides in the mapping grid identifiers for grids, each grid assigned to a specific set of the known item identifiers.

In an embodiment of 312, at 313, the item determiner provides in the mapping a grid cell identifiers for each grid identifier. Each grid cell identifier assigned to a specific known item identifier.

At 320, the item determiner receives a second image of an unknown item that is unable to be matched to a particular known item identifier for a particular item.

At 330, the item determiner provides the second image to the machine-learning algorithm.

At 340, the item determiner obtains as an output from the machine-learning algorithm a list of potential known item identifiers.

At 350, the item determiner selects a particular known item identifier from the potential known item identifiers of the list.

In an embodiment, at 351, the item determiner obtains a grid representing specific locations of specific items in the store. The item determiner matches a particular location associated with the where the second image was captured from to one or more grid cells of the grid. The item determiner identifies select ones of the specific items from the one or more grid cells. Finally, the item determiner uses the list combined with the select ones of the specific items to select the particular known item identifier.

In an embodiment of 351, at 352, the item determiner assigns probabilities to each of the one or more grid cells based on the particular location.

In an embodiment of 352, at 353, the item determiner selects the particular known item identifier based on a particular grid cell mapped to that particular known item identifier having a highest probability assigned and based on the particular known item identifier being present in the list provided as the output from the machine-learning algorithm.

In an embodiment, at 360, the item determiner updates a shopping cart to replace an item tracking identifier assigned to the unknown item with the particular known item identifier for the particular item.

Figure 4:
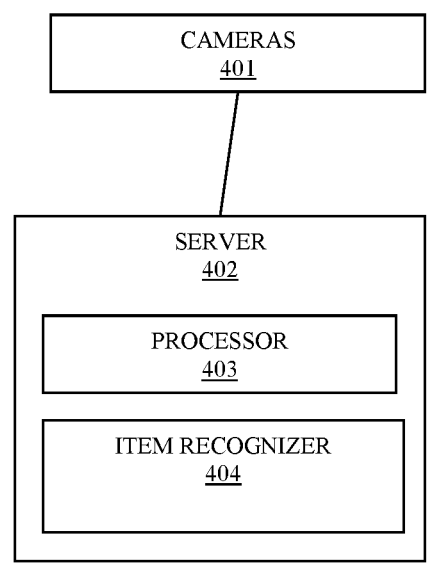
FIG. 4 is a diagram of a system for image processing to recognize an item, according to an example embodiment.

FIG. 4 is a diagram of a system 400 for image processing to recognize an item, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3 with respect to the server 120 and the cameras 110.

In an embodiment, system 400 is the cameras 110 and the server 120.

The system 400 includes a plurality of cameras 401 and a server 402. The server 402 includes at least one hardware processor 403 and configured to execute executable instructions from a non-transitory computer-readable storage medium as item recognizer 404.

The item recognizer 404 when executed from the non-transitory computer-readable storage medium on the processor 403 is configured to: 1) receive an image of an unrecognized item; 2) identify a location for a particular camera that captured the image; 3) provide the image and the location to a machine-learning algorithm trained in recognizing items that are occluded in images and trained on a planogram that maps item identifiers to specific locations within a store; 4) receive a list as an output from the machine-learning algorithm; 5) select an item identifier from the list as a known item; and 6) provide the item identifier to a transaction manager for adding to a shopping cart maintained for a shopper.

In an embodiment, the transaction manager is the transaction manager 122.

In an embodiment, the item recognizer 404 and the machine-learning algorithm is all of or some combination of: the item tracker 121, the person tracker 122, the planogram machine-learning item recognizer 123, the method 200, and/or the method 300.

In an embodiment, the item recognizer 404 is further configured to select the item identifier based on the item identifier being associated with a highest probability from a plurality of probabilities and potential item identifiers provided in the list.

In an embodiment, the system 400 is deployed as a portion of a frictionless store implementation where customers (individuals) shop through computer-vision and image processing and items and individuals are associated with one another with a shopping cart maintained for each individual. Each individual can checkout and pay for his/her shopping cart items using any of the above-referenced techniques discussed with the FIG. 1.

In an embodiment, the system 400 is deployed as a real-time security system within an enterprise.

In an embodiment, the system 400 is deployed as a combination frictionless store and real-time security system.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
cropping select pixels of an item candidate image associated with a tracked item as an image;
determining from the image that the tracked item is unable to be identified as a known item from the image based on current attributes derived from the image and a planogram data structure comprising known item locations within a store;
inputting the image, the current attributes, and the planogram data structure into a machine-learning algorithm as an input;
determining, from an output provided by the machine-learning algorithm, an item identifier for the known item.

2. The method of claim 1 further comprising, providing the item identifier to update a shopping cart of a shopper to include item details for the known item in the shopping cart.

3. The method of claim 1, wherein determining from the image further includes unsuccessfully attempting to process the image to determine the known item.

4. The method of claim 3, wherein inputting further includes providing metadata with the input to the machine-learning algorithm, wherein the metadata include a camera identifier, a frame number, and a time-stamp.

5. The method of claim 4, wherein providing the metadata further includes providing with the metadata a grid identifier for a grid associated with the camera identifier, wherein the grid mapped to specific item identifiers associated with items situated in predefined physical locations within the store based on the planogram data structure.

6. The method of claim 5, wherein providing further includes obtaining the grid identifier from the planogram data structure, wherein the planogram data structure further comprises the camera identifier mapped to the grid identifier and the grid identifier mapped to the specific item identifiers.

7. The method of claim 1, wherein determining from the output further includes receiving a list of specific item identifiers with a probability assigned to each specific item identifier as the output.

8. The method of claim 7, wherein receiving the list further includes selecting the item identifier from the specific item identifiers based on a highest probability included in the list.

9. The method of claim 7, wherein receiving further includes processing the list against the planogram data structure and selecting the item identifier from the specific item identifiers based on modified probabilities derived from the planogram data structure.

10. The method of claim 1, wherein determining from the output further includes determining the item identifier by augmenting the output with a probabilistic item-location based algorithm that accounts for specific items known to be located in a location associated with a camera that captured the image.

11. A method, comprising:
training a machine-learning algorithm with first images of items that are obscured or occluded in the first images, a planogram data structure that includes item locations for the items within a store, and known item identifiers for the items, wherein the first images comprising crop images, each cropped image representing select pixels of item candidate images;
receiving a second image of an unknown item that is unable to be matched to a particular known item identifier for a particular item, wherein the second image is cropped second pixels associated with the unknown item and cropped from a second item candidate image;
providing the second image to the machine-learning algorithm along with the planogram data structure for the store and item attributes derived from the second image;

obtaining as an output from the machine-learning algorithm a list of potential known item identifiers; and selecting a particular known item identifier from the potential known item identifiers.

12. The method of claim 11 further comprising updating a shopping cart to replace an item tracking identifier assigned to the unknown item with the particular known item identifier for the particular item.

13. The method of claim 11, wherein training further includes providing the planogram data structure as a mapping between camera identifiers for cameras that capture the first images, location identifiers for the locations, and the known item identifiers.

14. The method of claim 13, wherein providing further includes providing in the mapping grid identifiers for grids, each grid identifier assigned to a specific set of known item identifiers.

15. The method of claim 14, wherein providing further includes providing in the mapping a grid cell identifier for each grid identifier, each grid cell identifier assigned to a specific known item identifier.

16. The method of claim 14, wherein selecting further includes obtaining a grid representing specific locations of specific items in the store, matching a particular location associated with where the second image was captured to one or more grid cells of the grid, identifying select ones of the specific items from the one or more grid cells, and using the list combined with the select ones of the specific items to select the particular known item identifier.

17. The method of claim 11, wherein using further includes assigning probabilities to each of the one or more grid cells based on the particular location.

18. The method of claim 17, wherein assigning further includes selecting the particular known identifier based on a particular grid cell mapped to that particular known identifier having a highest probability assigned and based on the particular known identifier being present in the list.

19. A system, comprising:

cameras configured to capture images within a store;

a server that includes a processor;

the processor configured to execute executable instructions from a non-transitory computer-readable storage medium as an item recognizer;

the item recognizer when executed on the processor configured to:

receive an image of an unrecognized item, wherein the image is a cropped image representing select pixels of a candidate item image associated with the unrecognized item;

deriving item attributes for the unrecognized item from the image;

identify a location for a particular camera that captured the image using a planogram data structure for the store where the image was captured;

provide the image, the item attributes, the planogram data structure, and the location to a machine-learning algorithm trained in recognizing items that are occluded in images and trained on the planogram data structure that maps item identifiers to specific locations within the store;

receive a list as an output from the machine-learning algorithm;

select an item identifier from the list as a known item; and provide the item identifier to a transaction manager for adding to a shopping cart maintained for a shopper.

20. The system of claim 19, wherein the item recognizer is further configured to select the item identifier based on the item identifier being associated with a highest probability from a plurality of probabilities and potential item identifiers provided in the list.

* * * * *